Figure 1:
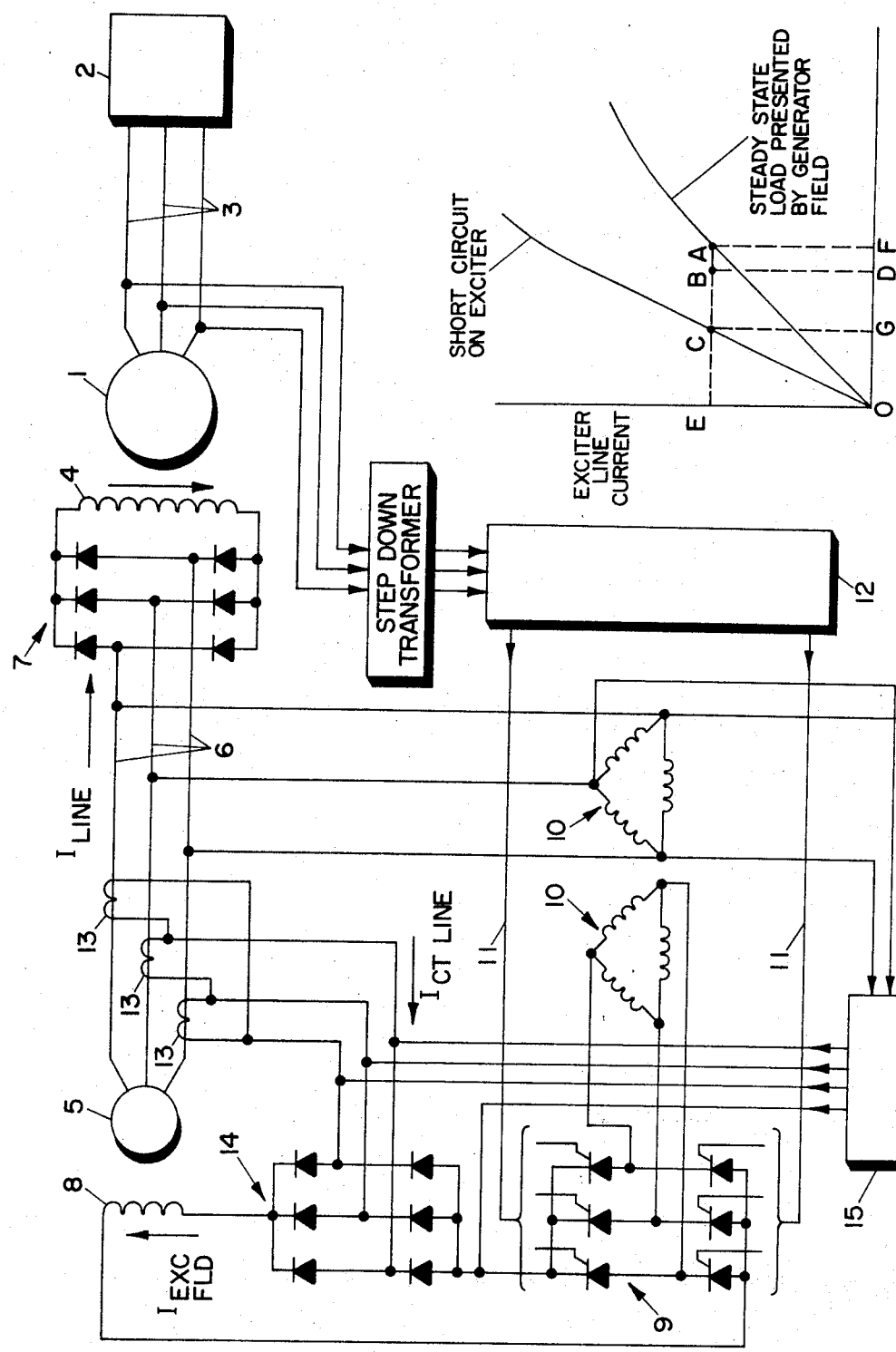

United States Patent

Spiller

[15] 3,673,488
[45] June 27, 1972

[54] ROTATING ALTERNATOR CURRENT GENERATOR SYSTEM

[72] Inventor: Willaim H. Spiller, Waynesboro, Va.
[73] Assignee: General Electric Company
[22] Filed: May 17, 1971
[21] Appl. No.: 143,935

[52] U.S. Cl. .............................. 322/28, 322/25, 322/DIG. 2, 322/27, 322/73
[51] Int. Cl. ......................................... H02p 7/06, H02p 9/26
[58] Field of Search ...................... 322/25, 28, 39, 72, 73, 60, 322/27, DIG. 2

[56] References Cited

UNITED STATES PATENTS

| | | | |
|---|---|---|---|
| 3,564,391 | 2/1971 | Dinger | 322/28 |
| 3,619,761 | 11/1971 | Nagae | 322/25 |

*Primary Examiner*—J. D. Miller
*Assistant Examiner*—Harvey Fendelman
*Attorney*—Michael Masnik, et al.

[57] ABSTRACT

The invention relates to rotating alternating current generator systems. Generator excitation is normally controlled by varying the field current to the exciter. An SCR rectifier circuit responsive to exciter output voltage normally provides controlled direct current for the exciter field while a diode rectifier circuit responsive to exciter output current provides direct current only during transient conditions when the exciter voltage may be low. The current boost diode rectifier circuit is coupled to current transformers located in the exciter output lines. The current boost circuit including the current transformers is designed to take advantage of the characteristic of most alternators that its short-circuit excitation requirement is considerably less than its rated-load excitation requirement, for the same alternator line current. Some exciters, notably salient-pole alternators, do not have the large separation between the short-circuit excitation condition and the rated-load excitation condition. Thus, it is difficult to design current transformers with a ratio low enough to insure that the current boost circuit will be regenerative under short-circuit conditions, and yet with a ratio high enough so that the current fed back will not interfere with the exciter field current supplied by the SCR circuit under normal operating conditions. A static switch, of unique design, is provided to insure compatibility between the SCR circuit and the diode rectifier circuit under normal operation, and yet permit the current feedback to be sufficient to support an exciter short circuit, regardless of the separation between the short circuit and rated-load circuit excitation conditions.

2 Claims, 4 Drawing Figures

INVENTOR.
WILLIAM H. SPILLER
BY Michael Masnik
HIS ATTORNEY

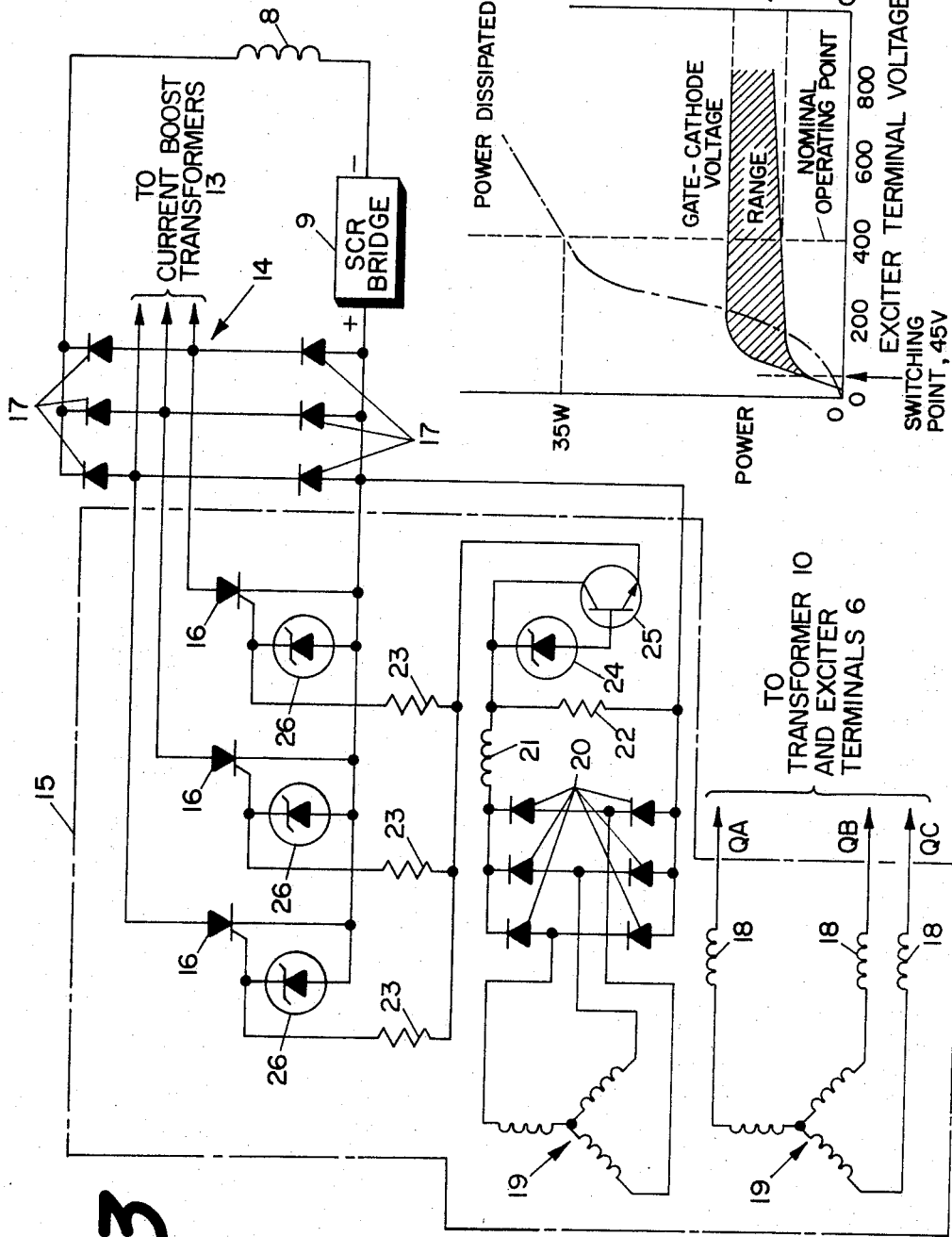

ROTATING ALTERNATOR CURRENT GENERATOR SYSTEM

BACKGROUND OF THE INVENTION

This invention relates to rotating, alternating current generator systems. In particular, the invention is directed to an improved arrangement for providing a current boost for the excitation field winding under generator output short-circuit conditions without adversely affecting the normal generator regulator control of the excitation field current during normal generator output conditions.

A fairly comprehensive background of the field in which the present invention applies may be obtained by reference to U.S. Pat. No. 3,564,391 entitled "Rotating Alternating Current Generator System", issued to Edward H. Dinger On Feb. 16, 1971 and assigned to the common assignee. The regulating circuitry disclosed in this patent operates adequately in most applications. There is, however, a need for improved control under those circumstances where there is not a large separation between the excitation curves for the short-circuit condition on the exciter and the steady state load condition presented by the generator field.

It is, therefore, an object of this invention to provide an improved control circuit.

It is another object of this invention to provide an improved current boost circuit to prevent collapse of the excitation system for a generator after suddenly applied system faults.

It is a further object of the invention to provide an improved current control arrangement.

In accordance with one aspect of the invention, there is provided a generator including a field for delivering an output voltage at its output terminals in accordance with the current developed in its field. An exciter including a field is connected to supply current from its output terminals to the generator field in accordance with the current in the exciter field. Regulator means responsive to the amplitude of the generator output voltage provides a first control signal. A full wave SCR means energized with the voltage developed at said exciter terminals is made responsive to said control signal for supplying DC current to the exciter field. During a fault condition, developed at the generator output, there is introduced an undesirable current in the generator field. This undesirable current operates to reduce the exciter output voltage to a low value and thereby reduce the exciter field current supplied by the SCR means to a low value. To provide current to the exciter field during this fault condition period, there is provided a current boost means for boosting current to the exciter field. The current boost means comprises a diode rectifier means in series with the SCR means and the exciter field. Current transformers located in the exciter output respond to the exciter output current during the undesired current condition period for supplying current through the diode rectifier means to the exciter field to maintain exciter field current during the fault condition. An SCR circuit is connected in parallel across the diode rectifier means. Means are provided for normally short circuiting the diode rectifying means including a saturable transformer and linear reactor circuit. The transformer and linear reactor circuit is responsive to the AC exciter output voltage for providing a second control signal of substantially constant amplitude to the SCR circuit over the normal range of exciter output voltage. This saturable transformer and linear reactor circuit, however, is responsive to the exciter output voltage falling below a given threshold level during the undesirable current condition period for modifying the second control signal. The SCR circuit is responsive to the modified second control signal for unshorting the diode rectifier means. The exciter field winding responds through the unshorted diode rectifier means to the exciter output current for providing field excitation for the exciter until the fault condition is removed.

Figure 2:
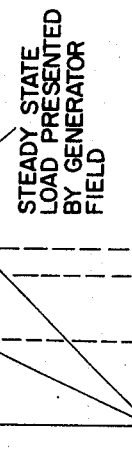

The aforementioned general objects and the various unique features of the present invention will be more clearly appreciated from the following description of a particular illustrative embodiment which is made in conjunction with the accompanying drawings wherein:

FIG. 1 illustrates in part schematic, part block diagram form a control for an alternating current generator system, FIG. 2 illustrates certain waveforms useful in explaining the operation of the present invention, FIG. 3 is a circuit diagram describing details of the present invention, and FIG. 4 further illustrates graphically the operation of the present invention.

Referring to FIG. 1, there is shown a generator 1 supplying alternating power to a load 2 over output terminals 3. Associated with the generator 1 is a field 4 which is energized from an exciter 5. Exciter 5 supplies exciter voltage over output terminals 6 to a diode bridge rectifier 7 where the alternating voltage is rectified before application to the field 4. The generator excitation is controlled by varying the current to the field 8 associated with the exciter 5. The exciter field current is controlled by an SCR circuit 9 connected in series with the field 8. The SCR means 9 is energized with alternating voltage available from the exciter output terminals 6 through the transformer 10. Each of the SCRs is gated on by a respective control signal available over cable 11 from a voltage regulator 12. The voltage regulator 12 responds to the voltage developed on the output terminals 3 of generator 1 after being stepped down in transformer 27 for producing signals whose amplitudes control the time at which the SCRs in the SCR means are gated on.

For preventing collapse of exciter self-excitation, a current boost circuit is provided for maintaining minimum exciter field current under predetermined conditions which otherwise might result in such collapse. Particularly high reliability is achieved by providing two independent exciter field current supplies. One such exciter field current sypply is the SCR means which supplies direct current to the exciter field at a level determined by its firing angle, or phase angle. Control of the exciter field current, and thus indirectly of the generator output voltage, is achieved by regulating the rectifier unit firing angle. This control is made available by the voltage regulator 12. For further details of the operation of this portion of the system, reference may be made to U.S. Pat. No. 3,564,391, issued to Edward H. Dinger on Feb. 16, 1971 and assigned to the common assignee.

A current boost is provided in order to prevent collapse of the excitation system after suddenly applied system faults, sudden generator reactive load pickup and generator load rejection. Exciter field power is normally taken from the exciter output terminals as previously described. However, exciter field current must be maintained even when the exciter terminal voltage drops very low. This drop in exciter terminal voltage occurs whenever the previously mentioned fault develops as, for example, a short across the output terminals of generator 1. This fault causes a large current to be developed in the field 4. This field current which transiently exceeds the exciter line current causes the rectifiers in the circuit 7 to freewheel. This action effectively short circuits the exciter output terminals. With the anode transformer primary voltage now reduced to 0, the SCR means 9 is no longer capable of supplying the exciter field, but two SCRs, one positive and one negative, remain conducting. The application of the short circuit on the exciter terminals will induce a component of field current in the exciter field, raising the field current transiently. But, without an additional source of field power, the difference between the duration of freewheeling of the rectifier circuit 7 and the duration of the now decaying exciter field current can cause the excitation system to collapse.

Collapse of the excitation system must be prevented, as it may be necessary for the generator to ride out the switching operations which reduced the exciter voltage to 0 for a short period of time.

Referring to FIG. 2, there is shown a diagram illustrating the relationship between exciter field current and exciter line current for two conditions. One of these conditions is the steady state load represented by the generator field supplied through the main field rectifier circuit 9 from the exciter terminals. The other is a short circuit on the exciter output lines. There are, of course, an infinite number of possible conditions that would fall between the two shown in FIG. 2.

To provide current boost to the field 8 during the fault condition, there are provided current transformers 13 coupled to the exciter output terminals. The current developed in the transformers 13 is applied to a diode rectifier means 14 where the alternating current is rectified and supplied as a boost current to the winding 8.

The ratio of the current transformers 13 is selected such that for any point, such as point A, on the steady state load curve of FIG. 2, the current supplied to the current boost rectifier means 0D is less than the field current required OF to supply the exciter line current 0E.

The current transformer ratio is such that in addition to meeting the requirement just described, the current supplied under the short-circuit condition for the same exciter line current to the current rectifier means 0D is more than the field current required 0G to supply the exciter line current 0E.

Thus, for steady state load conditions, the current boost feedback at any particular line current is less than the field current required to produce that line current. In this case, however, there is exciter line voltage with the result that the SCR rectifier means is in control and supplies the required field current which flows through the current boost diodes, the diode rectifier means and on into the exciter field. The current boost current also flows in the current boost rectifier means. Since current boost current is less than field current, the extra field current supplied from the SCRs flows across the current boost rectifier means. All six diodes in one embodiment are conducting continuously — the current transformer secondary line current modulates the steady exciter field current, divided among the three legs. Under this steady state load condition, the voltage across the bridge is only the forward drop of two diodes in series. The SCR rectifier means has control and is almost totally unaffected by the presence of the current boost bridge in the circuit.

For the short-circuit load condition, the current boost feedback at any particular line current is more than the field current required to produce that line current. During a short-circuit condition, voltage to the SCR bridge is 0; thus, its output voltage is 0, but the last SCRs to be conducting prior to the application of the short circuit, will continue to conduct. Because of the fact that current boost under the short-circuit condition is regenerative, and since an SCR path remains conducting, exciter field current will build up until the current transformers saturate. The transformers are designed so that at the point of saturation, the current boost circuit will be supplying the necessary exciter field current to maintain rated exciter line current.

It is obvious also that, depending on the actual ratio selected for the current boost current transformers, the boost circuit will take over control of the field, and maintain excitation for transient load conditions considerably less extreme than a continuous short circuit.

Unfortunately, some exciter types do not have the large separation between the two excitation curves shown in FIG. 2. Thus, it is not possible to design current transformers with a ratio low enough to insure that the current boost circuit will be regenerative under short circuit and yet with a ratio high enough so that the current fed back will not interfere with the exciter field current supplied by the SCR bridge, under normal operating conditions.

In accordance with the present invention, a static switch 15 has been developed to insure compatibility between the SCR bridge and the diode bridge under normal operation, and yet permit the current feedback to be sufficient to support an exciter short circuit, regardless of the separation between the two excitation curves for the exciter. This is illustrated in FIG. 3.

The major components of the static switch are three SCRs 16, connected in shunt in reverse polarity with each negative bus diode of the current boost bridge.

These SCRs are continuously gated, or "turned on", when the exciter voltage exceeds a given value, for example, 45 V, r.m.s., line-to-line. Whenever the exciter voltage drops below 45 V, the SCRs are ungated, which effectively eliminates them from the current boost circuit, allowing the current boost bridge to develop an output voltage.

With the SCRs gated, they and the negative bus diodes provide a circulating path for feedback current, of whatever magnitude, from the current boost transformers 13.

The gating circuit for the static switch takes its power from the exciter terminals 6 through transformer 10. Exciter voltage is supplied, through current-limiting reactors 18 to saturating transformers 19. The output voltage of the saturating transformers is rectified and filtered by rectifiers 20, choke 21, and resistor 22. The resulting DC is applied to the gates of the SCRs 16 through individual gate resistors 23, and through a common Zener diode and switching transistor 24 and 25. Zenera diodes 26 prevent the gate voltages from increasing beyond a safe operating level.

The saturating level of the saturating transformers and the Zener diode 24 voltage are such that positive switching of the gates occurs at a given value as, for example, 45 V exciter voltage as shown in FIG. 4, while power dissipation is kept low at high exciter voltages.

Should the regulator attempt to reduce the generator excitation suddenly, and by a large amount, the current boost bridge without the static switch would produce an output voltage to interfere with this attempt. The reason for this is that the current source is the generator field circuit, through the current boost transformers 13. This circuit is highly inductive; therefore, the feedback current will remain high when the exciter field current has been reduced appreciably. When the peak value of the feedback current exceeds the instantaneous value of the exciter field current, the current boost bridge will "turn on". This transient bridge output voltage degrades the negative response of the excitation system. The static switch will prevent this action from occurring, allowing the current boost bridge to "turn on" only when the excitation system is in danger of collapsing.

Although the present invention has been described with respect to a particular embodiment, the principles underlining this invention will suggest many additional modifications of this particular embodiment to those skilled in the art. Therefore, it is intended that the appended claims shall not be limited to the specific embodiment shown, but rather shall cover all such modifications as fall within the true spirit and scope of the present invention.

What is claimed as new and desired to be secured by Letters Patent of the United States is:

1. In combination, a generator including a field for providing an output voltage at its output terminals in accordance with the current in its field, an exciter including a field connected to supply current from its output terminals to the generator field in accordance with the current in the exciter field, regulator means responsive to the amplitude of said generator output voltage for providing a first control signal, full wave SCR rectifying means energized with the voltage developed at said exciter output terminals and responsive to said first control signal for supplying DC current to said exciter field, said generator responsive to a fault developed at said generator output for introducing an undesirable current in said generator field, said undesirable current operating to reduce the exciter output voltage to a low value and thereby reduce the exciter field current supplied by said SCR rectifier means to a low value, current boost means operative during said undesired current condition for boosting current to said exciter field, said current boost means comprising a diode rectifier means in series with said SCR rectifier means and said exciter field, current transformers located in said exciter output and responsive to the exciter output current during the undesired current condition for supplying current through said diode rectifier means to said exciter field to maintain exciter field current during the fault condition, an SCR circuit connected in parallel across said diode rectifier means, means for normally short circuiting said diode rectifier means comprising a saturable transformer and linear reactor circuit responsive to the AC exciter output voltage for providing a second control signal of substantially constant amplitude to said SCR circuit over the normal range of exciter output voltage but responsive to the exciter output voltage falling below a given threshold level during the undesirable current condition for modifying said second control signal, said SCR circuit responsive to said modified second control signal for unshorting said diode rectifier means, said exciter field responsive through said unshorted diode rectifier means to the exciter output current for providing field excitation for said exciter until the fault condition is removed.

2. In combination, a generator including a field, an exciter having a field for energizing said generator field, first means responsive to the output of said generator for providing a first control signal, second means responsive to said first control signal for energizing said exciter field, said generator responsive to a fault developed at said generator output for introducing an undesirable current in said generator field, said undesirable current operating to modify the exciter output voltage to an undesirable value and thereby modify the exciter field current supplied by said second means to an undesirable value, current boost means operative during said undesired current condition for boosting current to said exciter field, said current boost means comprising a third means in series with said second means and said exciter field, current transformers responsive to the exciter output current during the undesired current condition for supplying current through said third means to said exciter field to maintain exciter field current during the fault condition, fourth means coupled in parallel across said third means, means for normally short circuiting said third means comprising a saturable transformer and linear reactor circuit responsive to the AC exciter output voltage for providing a second control signal of substantially constant amplitude to said fourth means over the normal range of exciter output voltage but responsive to the exciter output voltage falling below a given threshold level during the undesirable current condition for modifying said second control signal, said fourth means responsive to said modified second control signal for unshorting said third means, said exciter field responsive through said unshorted fourth means to the exciter output current for providing field excitation for said exciter.

* * * * *